Patented Apr. 22, 1952

UNITED STATES PATENT OFFICE 2,594,145

REACTION PRODUCTS OF AN N-ACYL POLYIMIDE OF A POLYCARBOXYLIC ACID WITH A POLYMER CONTAINING HYDROXY OR AMINO RADICALS

Paul J. Flory, Ithaca, N. Y., assignor to Wingfoot Corporation, Akron, Ohio, a corporation of Delaware No Drawing. Application April 29, 1950, Serial No. 159,153

13 Claims. (Cl. 260—75)

This invention relates to the preparation of polymers and more particularly to the preparation of polymers of high molecular weight by coupling or interlinking polymers of lower molecular weight by means of a particular type of interlinking agent.

In many instances, while it is relatively easy to prepare polymers of moderate molecular weight, it is much more difficult to prepare polymers of high molecular weight. Thus, in preparing superpolyamides or superpolyesters, and particularly in the latter case, it is often difficult to carry the reaction to completion. Thus, polymers of sufficiently high molecular weight to have the desired properties, for example, for the production of fibers, plastics, films, etc., cannot easily be prepared.

One object of the present invention is to facilitate the production of polyamides, polyesters and polyesteramides of high molecular weight more efficiently and in shorter times than by other available means. Another object of the invention is to facilitate the preparation of such polymers in instances where the preparation is difficult by other means. Another object is to prepare such polymers without producing undesired side reactions and degradation which attend some of the previously available methods. Other objects and advantages will appear as the description proceeds.

According to the practice of the invention, a polymer having a plurality of hydroxyl and/or amino radicals attached thereto is treated with an N-acyl polyimide of a polycarboxylic acid, in which each of the carbonyl groups of the acyl radical is attached to the nitrogen atom of an imido radical. The amino radicals in the polymers must contain at least one reactive hydrogen and are preferably primary amino. The N-acyl polyimides and their preparation are described and claimed in copending application Serial No. 159,154, filed April 29, 1950, now U. S. Patent 2,558,675. The process may proceed according to either or both of the following illustrative equations, in which HO-R-OH represents a low molecular weight polymer having terminal hydroxyl groups and N,N'-terephthaloyl bis succinimide is shown as a typical N-acyl polyimide of a polycarboxylic acid.

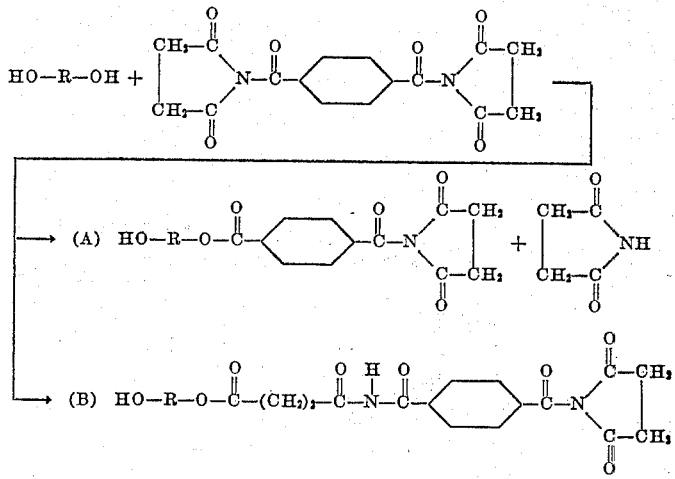

The mechanism of the reaction is not known for certain and it is possible that both of the indicated types of reaction occur. It appears that the reaction takes place at least in part according to equation (A) since some free imide is formed and can be recovered and identified.

In the equations, reaction has been shown on only one end of each of the starting materials. Similar reaction can and, in practice, does take place on both ends of the molecules.

A particularly important and valuable application of the invention is in the production of linear polymers of high molecular weight. For example, it is frequently difficult to obtain linear polyesters (of the glycol-dicarboxylic acid type) having molecular weights sufficiently high for optimum physical properties. Direct esterification of dicarboxylic acid and glycol proceeds slowly, particularly when the molecular weight becomes moderately large. Reaction of the glycol with a dicarboxylic acid chloride is much faster but is inapplicable to certain types and in other cases it may be preferred to avoid use of the acid chloride because of unavailability or because of the deleterious effects of the hydrogen chloride released during the reaction. According to the present invention, a polyester or polyamide or polyester-amide of low or moderate molecular weight having hydroxyl and/or amino end groups can be converted within a relatively short period of time to a polymer of high molecular weight.

Various methods are available for preparing low polymers with terminal hydroxyl and/or amino end groups. For example, a dicarboxylic acid can be reacted with more than an equivalent proportion of glycol and/or diamine. Small excesses produce larger polymer molecules while large excesses produce smaller molecules. Polyamides can also be prepared by reacting a dicarboxylic acid chloride with an excess of diamine. Some polyesters can also be prepared by reacting an excess of glycol with an acid chloride. Polyamides can also be prepared by self-polymerization of a monoamino-monocarboxylic acid in the presence of a diamine. Polyesters can be prepared similarly from a monohydroxymonocarboxylic acid and a glycol. Polyesters can be prepared by an ester interchange reaction between a glycol and an alkyl or aryl ester of a dicarboxylic acid. The particular method for forming the "intermediate" polymer having terminal amino and/or hydroxyl groups is not part of the present invention, which is directed to the interlinking of such polymers, however formed.

In order to produce polymers of very high molecular weight, the molecular quantities of interlinking agent and initial polymer entering into the reaction must be approximately equal. One way of ensuring this is to mix them in the proper proportion. Another way is to add the interlinking agent portionwise, with complete reaction before the next addition.

The practice of the invention in the preparation of linear polymers is illustrated by Examples 1 to 6.

Example 1

Seventeen grams of sebacyl chloride and 13.0 grams (5 mol percent excess) of decamethylene glycol were condensed by heating them together in a glass tube at 110° C. for three hours and then at 175° C. for two hours. Inert gas (pure nitrogen) was bubbled through the polymer to sweep out evolved hydrogen chloride and to avoid all contamination with air. The melt viscosity of the resulting low molecular weight, hydroxyl group terminated, decamethylene sebacate polyester was 11.5 poises at 200° C. The viscosity showed little change with further heating. The number average molecular weight estimated from the melt viscosity (see J. Am. Chem. Soc. 62, 1057 (1940)) is 6700, a value in approximate agreement with that expected from the amount of glycol used in excess of the sebacyl chloride. To 6.13 grams of the above polyester was added 0.439 grams of N,N'-sebacyl-bis-phthalimide, representing a small excess over the amount required to react with all of the terminal hydroxyl groups of the polymer. The mixture was then heated at 200° C. in the same apparatus used above. Viscosities were measured at intervals with results as follows:

| Time of heating at 200° C., in minutes | Melt viscosity at 200° C., in poises |
|---|---|
| 75 | 284 |
| 115 | 590 |
| 177 | 1,400 |
| 330 | 2,500 |
| 445 | 4,700 |
| 650 | 6,800 |

The molecular weight estimated from the final viscosity is 23,000. Whereas the polymer prior to interlinking was relatively friable and of low strength, the higher polymer obtained through interlinking was tough and could be molded to give strong, durable articles. Fiber from the initial polymer were weak and would break without drafting. Fibers from the final polymer could be cold drawn in a manner characteristic of crystalline linear high polymers, and the cold drawn fibers exhibited high tenacities.

Example 2

A decamethylene sebacate polyester was prepared using a 5 mol percent excess of the glycol, following a procedure equivalent to that described in Example 1. The final melt viscosity at 175° C. was 17.6 poises and did not rise with prolonged heating of the polymer. Three and ninety-hundredths grams of this polymer and 0.20 grams of N,N'-sebacyl-bis-succinimide were heated at 175° C. as described above. Within 70 minutes, the viscosity had risen to 1,680 poises. After heating for 160 minutes, the viscosity was 5,100 poises and after 230 minutes it was 6,950 poises. The final viscosity corresponded to a number average weight of approximately 21,500. The product was tough and strong and fibers formed from it could be cold drafted readily.

Example 3

Fifteen-hundredths grams of N,N'-isophthaloyl-bis-succinimide was added to 3.00 grams of the low molecular weight decamethylene sebacate polyester used in Example 2, and the mixture was heated at 200° C. for 90 minutes. The viscosity of the melt was 5,200 poises. After heating for an additional four hours, it was 13,000 poises.

Example 4

A tetramethylene terephthalate polymer was prepared by co-reacting 40.00 grams of pure terephthaloyl chloride with 18.20 (2.5 mol percent excess) of pure tetramethylene glycol. The reaction was carried out by mixing the ingredients in 120 cubic centimeters of bromobenzene and heating at 70 to 95° C. for about a half hour, then refluxing the solution for an hour. The temperature was raised and the solvent distilled off, the final temperature reached being 241° C. A slow stream of dry, oxygen-free nitrogen was passed through the melt while heating for about an hour at this temperature. The melt viscosity was 283 poises at 241° C., and showed relatively little change with further heating. Four hundred fifty-six thousandths grams of N,N'-sebacyl-bis-phthalimide was added to 8.79 grams of the above polymer and the mixture was heated in the usual manner at 241° C. After 90 minutes the viscosity reached 1,680 poises. An additional 0.076 gram of N,N'-sebacyl-bis-phthalimide was added to the mixture, which was then heated for an additional half hour. The final viscosity was 2,600 poises. Whereas the molecular weight of the initial polymer was too low for manifestation of good fiber properties, the final polymer was well within the desired molecular weight range, fibers from the latter polymer readily cold drafting to yield well oriented fibers exhibiting high tenacity.

Example 5

A low molecular weight ethylene terephthalate was prepared by reacting dimethyl terephthalate with excess ethylene glycol in the presence of catalytic amounts of magnesium ribbon at reflux temperatures. The excess glycol was removed in vacuo and the polymer was heated in vacuo at 280° C. until the melt viscosity at this temperature was 25 poises. This polymer has an estimated molecular weight of 5,760. To 15 milliliters of o-dichlorobenzene in an all-glass polymerization tube was added 4.342 grams of the polymer and the mixture was heated at reflux until solution was complete. To this solution was added 0.347 gram of N,N'-sebacyl diphthalimide and the solution was heated at reflux for 2.5 hours. The solvent was distilled off and the thick viscous polymer had a melt viscosity of 5,200 poises at 280° C. The polymer was a light tan, crystalline solid with a melting point of 261–263° C.

*Example 6*

A low molecular weight polyamide having amino end groups was prepared by reacting decamethylene diammonium sebacate (the simple salt of equimolecular proportions of decamethylene diamine and sebacic acid) with 7 mol percent (based on the decamethylene diammonium sebacate) of decamethylene diamine, the reaction being carried out at 218° C. for two hours. The resulting polymer had a melt viscosity of 74.8 poises at this temperature. Three and three hundred twenty-eight thousandths grams of this polymer were reacted with 0.345 gram of N,N'-sebacyl-bis-phthalimide by thoroughly mixing the two solid reactants and heating them under nitrogen for one hour at 218° C. The clear molten polymer had a final melt viscosity of 1,624 poises at 218° C. It crystallized, on cooling, to a creamy-white solid. The melting point of both the low viscosity polymer and the final product was 201–203° C. Fibers prepared from the final product were cold drawable.

Cross-linked polymers having properties similar to those of a vulcanized rubber or a gelled or thermoset resin can be prepared by the process of the invention when either or both the N-acyl polyimide and the "intermediate" polymer contain more than two functional groups.

For example, such products result when a linear polyester or polyamide or polyesteramide having hydroxyl and/or amino end groups is treated with an N-acyl polyimido compound having three or more imido groups per molecule.

Another method for preparing cross-linked or network polymers is by reacting a nonlinear polyester, polyamide or polyesteramide containing more than two amino and/or hydroxyl groups per molecule with an N-acyl polyimide containing at least two imido groups per molecule. Suitable nonlinear polymers may be prepared, for example, by condensing a glycol, dibasic acid and a polycarboxylic acid having a functionality greater than two or by condensing a glycol, a polyhydric alcohol having a functionality greater than two and a dicarboxylic acid. In preparing these initial polymers, it is preferred to use a sufficient amount of glycol to prevent gelation of the composition of the esterification process or, if gelation does occur, the condensation preferably should not proceed to an extent beyond the gelation point such that the product cannot be milled or molded or otherwise processed in the subsequent interlinking reaction. The proportion of the glycol required for a given amount of the polyfunctional compound may be determined by trial or it may be computed approximately from theory. (See JACS, volume 63, page 3083 (1941)). Further examples of suitable polymers having a functionality greater than two are those of the "multichain" type prepared by reacting a relatively small amount of an alcohol containing at least three reactive hydroxyl groups with a relatively large amount of a monohydroxy monocarboxylic acid or by reacting a relatively small amount of a polyamino compound containing at least three reactive amino groups with a relatively large amount of a monoaminomonocarboxylic acid or a monohydroxymonocarboxylic acid. The nonlinear polymer prepared according to one of these methods, or any other method, is then treated with a polyimido compound having a functionality of at least two. It is preferred to use a proportion of this compound which is approximately equivalent to the hydroxyl or amino groups present in the polymer. This polyimido compound is incorporated by stirring, milling or by dissolving in a suitable solvent. This mixture can be molded or cast into the form of the final object and reaction effected by heating at elevated temperature.

Also included in the scope of this invention is the treatment of chain polymers having multiple hydroxyl groups along the chain with bis- or other polyimido compounds. Thus, polyvinyl alcohol or copolymers containing vinyl alcohol units may be converted to thermoset products by treating with polyimido compounds having a functionality of two or more. Cellulose and derivatives thereof which contain free hydroxyl groups may be similarly treated.

The polyimido compound is preferably used in an amount approximately in stoichiometric equivalence with the hydroxyl and/or amino end groups.

Thus, the invention includes the conversion of thermoplastic polymers having at least two hydroxyl and/or amino groups per molecule to "vulcanized" or thermoset compositions through treatment with polyimido compounds as described above. If the initial polymer molecules contain only two hydroxyl and/or amino groups per molecule, as in the case of linear polymers terminated with hydroxyl and/or amino groups, a polyimido compound containing a least three imido groups must be used in order to achieve cross-linking. If the number of available hydroxyl and/or amino groups per molecule is three or greater, either the bis- or higher polyimido compounds may be used.

The practice of the invention in preparing cross-linked polymers is illustrated by the following representative examples.

*Example 7*

Fifteen and seventy-eight hundredths grams (0.156 equivalent) of isophthalyl chloride and 1.37 grams (0.015 equivalent) of cyclohexanone tetrapropionic acid were heated cautiously in a flask until evolution of hydrogen chloride subsided. Seventeen and forty-three hundredths grams (0.200 equivalent) of decamethylene glycol and 50 cubic centimeters of ethylene chloride were added and the mixture was refluxed for 18 hours, after which the solution was transferred to a cylindrical reaction tube 32 millimeters in diameter and of the type ordinarily used for polyesterifications. Solvent was removed by distillation through the side arm above the reaction tube assembly, a stream of nitrogen being passed through the polymer. The molten polymer was quite fluid. The interlinking agent (6.81 grams or 0.030 equivalent of N,N'-sebacyl-bis-phthalimide) was then added and the mixture was heated at 218° C. The mixture thickened rapidly and was completely gelled within one hour. The product was rubbery at room temperature. It underwent swelling in chloroform but would not dissolve completely in this solvent or in other inert solvents.

*Example 8*

Seventeen and ninety-one hundredths grams (0.1765 equivalent) of isophthalyl chloride and 17.43 grams (0.2000 equivalent) of decamethylene glycol were placed in a cylindrical reaction tube 32 millimeters in diameter, together with 50 cubic centimeters of o-dichlorobenzene. With pure nitrogen bubbling through the mixture, they were allowed to react at 61° C. for one and a half hours and at reflux for 7 hours. Solvent was then distilled off, the polymer was cooled and 0.756 grams (0.0078 equivalent) of cyclohexanone tetrapropionic acid was added. The mixture was heated at 218° C. with pure nitrogen bubbling through the melt for nine hours. The viscosity was about 21 poises at this temperature. The interlinking agent (2.80 grams or 0.0122 equivalent of N,N'-sebacyl-bis-phthalimide) was then added, employing about 77% of the amount equivalent to the excess of glycol initially used, to adjust losses of glycol through sublimation. The viscosity increased rapidly on further heating at 218° C. Gelation set in after 15 minutes. After heating the polymer and interlinking agent for an hour, the product was cooled. The product was rubbery and nontacky.

I claim:

1. A method for increasing the molecular weight of a polymer containing at least two radicals selected from the group consisting of hydroxyl radicals and amino radicals containing at least one reactive hydrogen atom which comprises heating said polymer with an N-acyl polyimide of a polycarboxylic acid in which each of the carbonyl groups of the acyl radical is attached to the nitrogen atom of an imido radical.

2. A method for increasing the molecular weight of a polymer containing at least two radicals selected from the group consisting of hydroxyl radicals and amino radicals containing at least one reactive hydrogen atom which comprises heating said polymer with an N-acyl polyimide of a polycarboxylic acid in which each of the carbonyl groups of the acyl radical is attached to the nitrogen atom of an imido radical, said N-acyl polyimide being used in amount equivalent to said hydroxyl and amino radicals.

3. A method for increasing the molecular weight of a polymer containing at least two radicals selected from the group consisting of hydroxyl radicals and amino radicals containing at least one reactive hydrogen atom which comprises heating said polymer with an N,N'-acyl-bis-imide of a dicarboxylic acid, said N,N'-acyl-bis-imide being used in amount equivalent to said hydroxyl and amino radicals.

4. A method for increasing the molecular weight of a polymer containing two radicals selected from the group consisting of hydroxyl radicals and amino radicals containing at least one reactive hydrogen atom which comprises heating said polymer with an N,N'-acyl-bis-imide of a dicarboxylic acid, said N,N'-acyl-bis-imide being used in amount equivalent to said hydroxyl and amino radicals.

5. A method for increasing the molecular weight of a polymer containing at least two hydroxyl radicals which comprises heating said polymer with an N-acyl polyimide of a polycarboxylic acid in which each of the carbonyl groups of the acyl radical is attached to the nitrogen atom of an imido radical.

6. A method for increasing the molecular weight of a linear polyester containing terminal hydroxyl radicals which comprises heating said polymer with an N,N'-acyl-bis-imide of a dicarboxylic acid.

7. A method for increasing the molecular weight of polymeric tetramethylene terephthalate containing terminal hydroxyl radicals which comprises heating said polymer with an N,N'-acyl-bis-imide of a dicarboxylic acid.

8. A method for preparing a superpolymer which comprises heating equivalent proportions of N,N'-sebacyl-bis-phthalimide and polymeric tetramethylene terephthalate having terminal hydroxyl groups.

9. A method for increasing the molecular weight of a polymer containing at least two amino radicals which comprises heating said polymer with an N-acyl polyimide of a polycarboxylic acid in which each of the carbonyl groups of the acyl radical is attached to the nitrogen atom of an imido radical.

10. A method for increasing the molecular weight of polymeric ethylene terephthalate containing terminal hydroxyl radicals which comprises heating said polymer with an N,N'-acyl-bis-imide of a dicarboxylic acid.

11. A method for increasing the molecular weight of cellulose which comprises heating the cellulose with an N,N'-acyl-bis-imide of a dicarboxylic acid.

12. A method for increasing the molecular weight of a vinyl alcohol polymer containing multiple hydroxyl groups which comprises heating said polymer with an N-acyl-polyimide of a polycarboxylic acid in which each of the carbonyl groups of the acyl radical is attached to the nitrogen atom of an imido radical.

13. A method for increasing the molecular weight of polyvinyl alcohol which comprises heating the polyvinyl alcohol with an N,N'-acyl-bis-imide of a dicarboxylic acid.

PAUL J. FLORY.

No references cited.